United States Patent [19]
Moeller

[11] Patent Number: 6,158,043
[45] Date of Patent: Dec. 5, 2000

[54] SIGNAL PROCESSING APPARATUS AND METHOD

[75] Inventor: Gert Lykke Moeller, Lemvig, Denmark

[73] Assignee: Bang and Olufsen A/S, Denmark

[21] Appl. No.: 09/295,815

[22] Filed: Apr. 20, 1999

Related U.S. Application Data

[60] Continuation of application No. 08/895,438, Jul. 16, 1997, Pat. No. 5,996,114, which is a division of application No. 07/887,244, May 19, 1992, abandoned, which is a continuation of application No. 07/700,942, May 13, 1991, abandoned, which is a continuation of application No. 07/424,112, Oct. 19, 1989, abandoned.

[30] Foreign Application Priority Data

Feb. 3, 1989 [GB] United Kingdom .................. 8902414

[51] Int. Cl.$^7$ ................................................. G06F 11/00
[52] U.S. Cl. ............................................................. 714/825
[58] Field of Search ..................................... 714/825, 759

[56] References Cited

U.S. PATENT DOCUMENTS

| | | | |
|---|---|---|---|
| 3,706,977 | 12/1972 | Dailey et al. | 340/173 R |
| 3,706,978 | 12/1972 | Dailey et al. | 340/173 R |
| 4,084,260 | 4/1978 | Fleming et al. | 364/900 |
| 4,385,371 | 5/1983 | Shafer et al. | 365/49 |
| 4,443,860 | 4/1984 | Vidalin | 364/900 |
| 4,777,585 | 10/1988 | Kokawa et al. | 364/164 |
| 4,849,905 | 7/1989 | Loeb et al. | 364/513 |
| 4,862,407 | 8/1989 | Feete et al. | 364/900 |
| 4,890,240 | 12/1989 | Loeb et al. | 364/513 |
| 4,908,778 | 3/1990 | Moriyasu et al. | 364/513 |

FOREIGN PATENT DOCUMENTS

| | | |
|---|---|---|
| 0 246 556 A1 | 5/1987 | European Pat. Off. . |
| 0246556 A1 | 1/1991 | European Pat. Off. . |
| 62-280674 | 12/1987 | Japan . |
| 63-139267 | 6/1988 | Japan . |
| 063271641 | 11/1988 | Japan . |
| 63-284 639 | 11/1988 | Japan . |
| 01224842 | 9/1989 | Japan . |
| 1 536 434 | 6/1978 | United Kingdom . |
| 2 160 684 | 12/1985 | United Kingdom . |
| 2 207 531 | 12/1991 | United Kingdom . |

OTHER PUBLICATIONS

The Computer Dictionary, Second Edition, "The Comprehensive Standard for Business, School, Library, and Home" by Microsoft Press, 1994, pp. 19–20.

K.A. Ross and C.R.B. Wright, *Discrete Mathematics*, pp. 61–83, 486–504 (2d ed. Prentice–Hall 1988).

Fordyce, K. and G. Sullivan: "Boolean Array Structures for a Rule–Based Forward Chaining Inference Engine". APL Quote Quad PROC APL87, 17 (4), pp. 185–195.

Glasgow, J.J.: "Logic Programming in Nial", Queen's University, Kingston, Canada 1984, pp. 1–30.

Glasgow, J.J., Browse, R.: "Programming Language for Artificial Intelligence", Department of Computing and Information Science, Queen's University, Kingston, Canada, 1984, pp. 1–34.

(List continued on next page.)

*Primary Examiner*—Phung M. Chung
*Attorney, Agent, or Firm*—Brinks Hofer Gilson & Lione

[57] ABSTRACT

An apparatus and method of processing signals is provided wherein an input signal has components representing aspects of a physical entity which are in a known state and other components which are unknown. The apparatus and method processes the signal in accordance with stored data representing rules which indicate which combinations of the components are possible. Rules are identified which involve the known components and all of the combinations consistent with the known states are identified. If all of these combinations have the same value for a particular component, the component is determined to have that value in the output signal. The rules are stored as binary representations of the possible combinations, and the components of the input and output signals may represent two allowable states, tautology (undefined state) and inconsistency (inallowable state).

7 Claims, 19 Drawing Sheets

OTHER PUBLICATIONS

M. Nagao et al., "Iwanami Lecture Information Science—7 Logics and Meaning," Iwanami Shoten, 1983, p. 21 and Japanese– and English–language versions of a Japanese Office Action that cited the Nagao article.

International Search Report for International Application No. PCT/EP 90/00213 (2 pages).

Franksen, O.I.: "Mr. Baggage's Secret. The Tale of a Cypher and APL". Strandberg, Denmark, 1984, & Prentice–Hall Inc., New Jersey, USA, 1985, pp. 163–168.

Looney, C.G.: "Logic Controls via Boolean Rule Matrix Transformations". IEEE Transactions on Systems, Man, and Cybernetics, vol. SMC–17, No. 6, pp. 1077–1082, Nov./Dec. 1987.

Franksen, O.I.: "Group Representation of Finite Polyvalent Logic—a Case Study Using APL Notation". In Neimi, A.(ed.): A Link Between Science and Application of Automatic Control. Proceedings IFAC World Congress 1978, vol. 2, Pergamon Press, New York, 1979, pp. 875–887.

Franksen, O.I.: "Are Data–Structures Geometrical Objects?". Syst. Anal. Model. Simul. vol. 1, 1984. Part 1: "Invoking the Erlanger Program", No. 2, pp. 113–130.

Franksen, O.I.: "Are Data–Structures Geometrical Objects?". Syst. Anal. Model. Simul. vol. 1, 1984. Part II: "Invariant Forms in APL and Beyond", No. 2, pp. 131–150.

Franksen, O.I.: "Are Data–Structures Geometrical Objects?". Syst. Anal. Model. Simul. vol. 1, 1984. Part III: "Appendix A: Linear Differential Operators", No. 3, pp. 251–260.

Franksen, O.I.: "Are Data–Structures Geometrical Objects?". Syst. Anal. Model. Simul. vol. 1, 1984. Part IV: "Appendix B: Logic Invariants by Finite Truthtables", No. 4, pp. 339–350.

Moeller, Gert L.: "A Logic Programming Tool for Qualitative System Design". APL Quote Quad PROC APL86, 16(4), pp. 266–271 (1986).

Eusebi, Ed and J.A. Brown: "APL2 and A1: A Study of Search". APL Quote Quad PROC APL 86, 16(4), pp. 295–300 (1986).

Brown, J.A., J.H. Cook, L.H. Groner, Ed. Eusebi: "Logic Programming in APL2". APL Quote Quad PROC APL86, 16(4), pp. 282–288 (1986).

IBM *Journal of Research and Development*, vol. 30, No. 1, pp. 93–101.

"Underlying Principles of Expert Systems", pp. 265–282, Christian R. Pellegrini, CERN European Organization for Nuclear Research, Proceedings from 1986 CERN School of Computing, Renesse, The Netherlands, Aug. 30—Sep. 13, 1986, CERN 87–04, Apr. 29 1987.

"Pedagogical, Natural Language and Knowledge Engineering Techniques in SOPHIE I, II and III," John Seely Brown, Richard R. Burton and Johan De Kleer, Chapter 11, "Intelligent Tutoring Systems", pp. 227–282, Academic Press, 1982.

"A Model–Based Approach to Updating Databases with Incomplete Information", pp. 167–196, Marianne Winslett, University of Illinois, Urbana, ACM Transactions on Database Systems, vol. 13, No. 2, Jun. 1988.

Japanese Patent Office, Patent Laying–Open Gazette—Laying–Open No. 63–41926, "High Speed Interference Method" with partial English translation (Feb. 23, 1988).

Japanese Patent Office, Patent Laying–Open Gazette—Laying–Open No.62–251836, "Unit Diagnosing Method" with partial English translation (Nov. 2, 1987).

Japanese Patent Office, Patent Laying–Open Gazette—Laying Open No. 62–19940, "High Speed Inference Processing System" with partial English translation (Jan. 28, 1987).

FIG.1
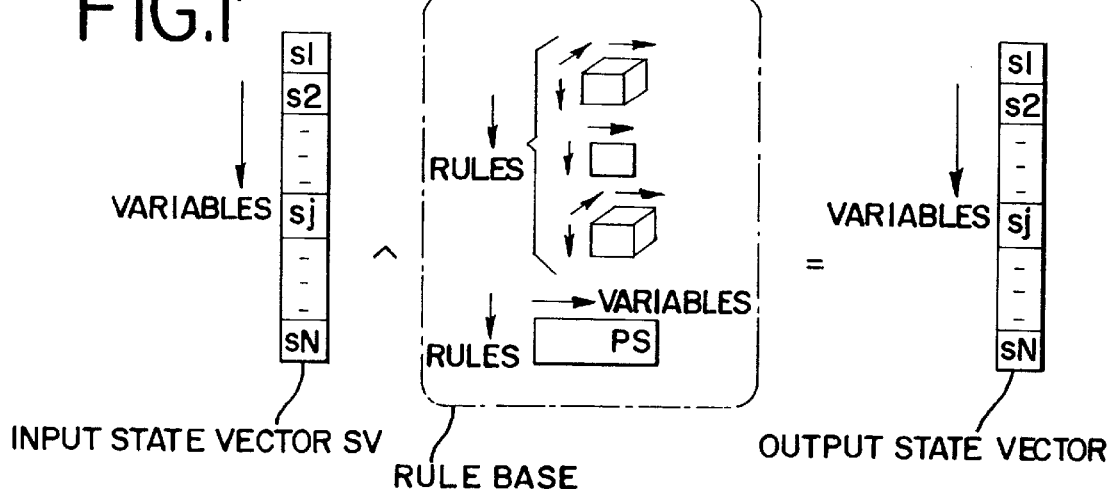
INPUT STATE VECTOR SV  RULE BASE  OUTPUT STATE VECTOR
FIG.2A  ARRAY FORM (ALL COMBINATIONS):
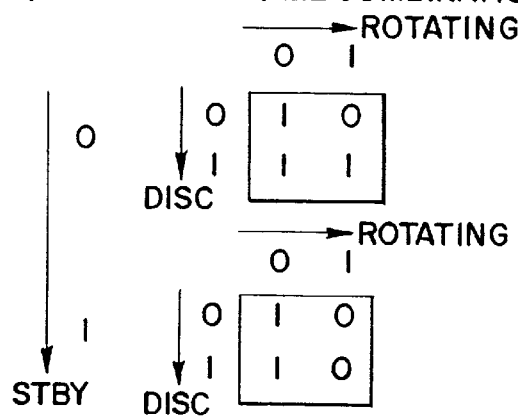
FIG.2B  INDEX FORM (LEGAL COMBINATIONS):
| STBY | DISC | ROTATING |
|------|------|----------|
| 0 | 0 | 0 |
| 0 | 1 | 0 |
| 0 | 1 | 1 |
| 1 | 0 | 0 |
| 1 | 1 | 0 |
FIG.2C  INDEX FORM (ILLEGAL COMBINATIONS):
| STBY | DISC | ROTATING |
|------|------|----------|
| 0 | 0 | 1 |
| 1 | 0 | 1 |
| 1 | 1 | 1 |

INPUT REGISTERS: SV(STATE VECTOR), VC(VARIABLE CONTROL), RC(RULE CONTROL)
OUTPUT REGISTERS: SV, EV(EXPLANATION VECTOR), CRN(CONTRADICTION RULE NUMBER
BUFFER REGISTER: RL(RULE LIST)

FIG. 3A-2

APL-FUNCTION <u>DEDUCT</u>:

```
       ∇DEDUCT[□]∇
       ∇ SV2←RC DEDUCT SV;VC;I;RULE;RL;CRN
[1]      VC← ≠/SV
[2]    L1:RL← SC
[3]      →(~v/RL)/0
[4]      RL←RL/ιpRL
[5]      I←0
[6]    L2:±'RULE←RULE,'⊤RL[I]
[7]      RULE CONSULT I
[8]      →(CRN≠⁻1)/0
[9]      I←I+1
[10]     →((pRL)>I)/L2
[11]     →L1
       ∇
```

FIG. 3B

THE RULE BASE SCANNING UNIT (3)

INPUT: RC, VC, PS
OUTPUT: RL

| INTERPRETATION | APL-CODE |
|---|---|
| EACH VARIABLE IDENTIFIED WITH A LOGICAL "1" IN THE VARIABLE CONTROL VECTOR VC, IS ASSOCIATED WITH A CERTAIN COLUMN IN THE PS-MATRIX. ALL PS-COLUMNS SATISFYING THE CONSTRAINT THAT THE CORRESPONDING VARIABLE IN VC IS LOGICAL "1", ARE STORED IN A NEW MATRIX MI (A SUBMATRIX OF PS). | MI←VC/PS |
| FIND ALL ROWS IN MI (THAT IS, RULES) WITH AT LEAST ONE CORRESPONDING VARIABLE. THE RESULT IS A RULE LIST VECTOR RL. | RL←v/MI |
| MAKE AN ELEMENT-BY-ELEMENT LOGICAL AND BETWEEN RC AND RL AND STORE THE RESULT IN RL. | RL←RC∧RL |

APL-FUNCTION <u>SC</u>:

```
       ∇SC[□]∇
       ∇ RL←SC
[1]      RL←RC∧v/VC/PS
       ∇
```

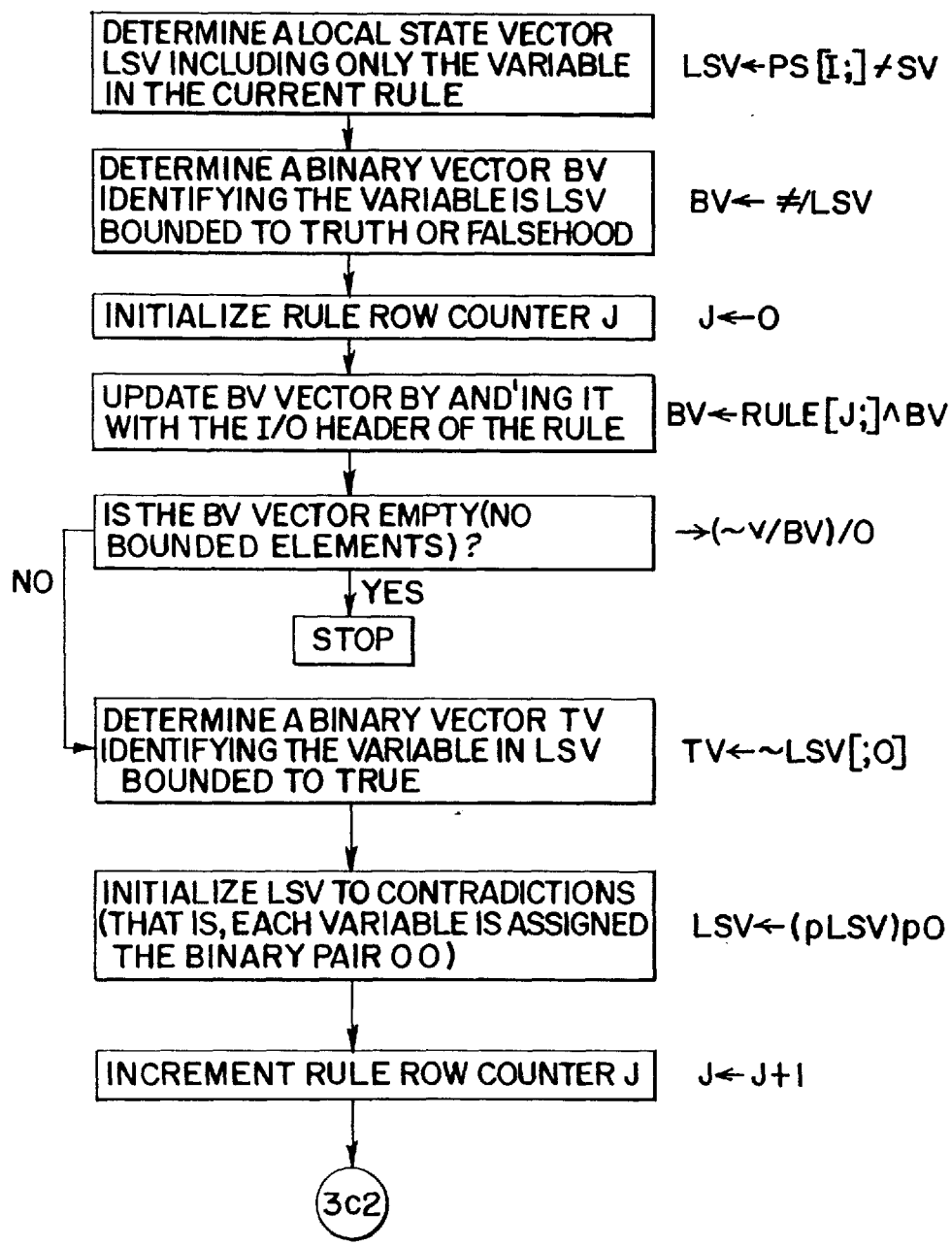

APL-FUNCTION CONSULT:

```
        ∇CONSULT [□]∇
      ∇ RULE CONSULT I;J;LSV;BV;TV;BVRR;LV
[1]     LSV←PS[I;]≠SV
[2]     BV←≠/LSV
[3]     J←0
[4]     BV←RULE[J;]∧BV
[5]     →(~∨/BV)/0
[6]     TV←~LSV[;0]
[7]     LSV←(ρLSV)ρ0
[8]     J←J+1
[9]     L1:BVRR←BV∧RULE[J;]
[10]    →(~∧/TV=BVRR)/L2
[11]    LSV[;0]←(~RULE[J;])∨LSV[;0]
[12]    LSV[;1]←RULE[J;]∨LSV[;1]
[13]    L2:J←J+1
[14]    →((1↑ρRULE)>J)/L1
[15]    ±((∧/,LSV)=0)/'CRN←I'
[16]    ±((+/=/LSV≤1)/'RC[I]←0'
[17]    SV[PS[I;]/ι¯1↑ρPS;]←LSV
[18]    LV←(BV≠≠/LSV)/PS[I;]/ι¯1↑ρPS
[19]    EV[LV]←I
[20]    VC[LV]←I
      ∇
```

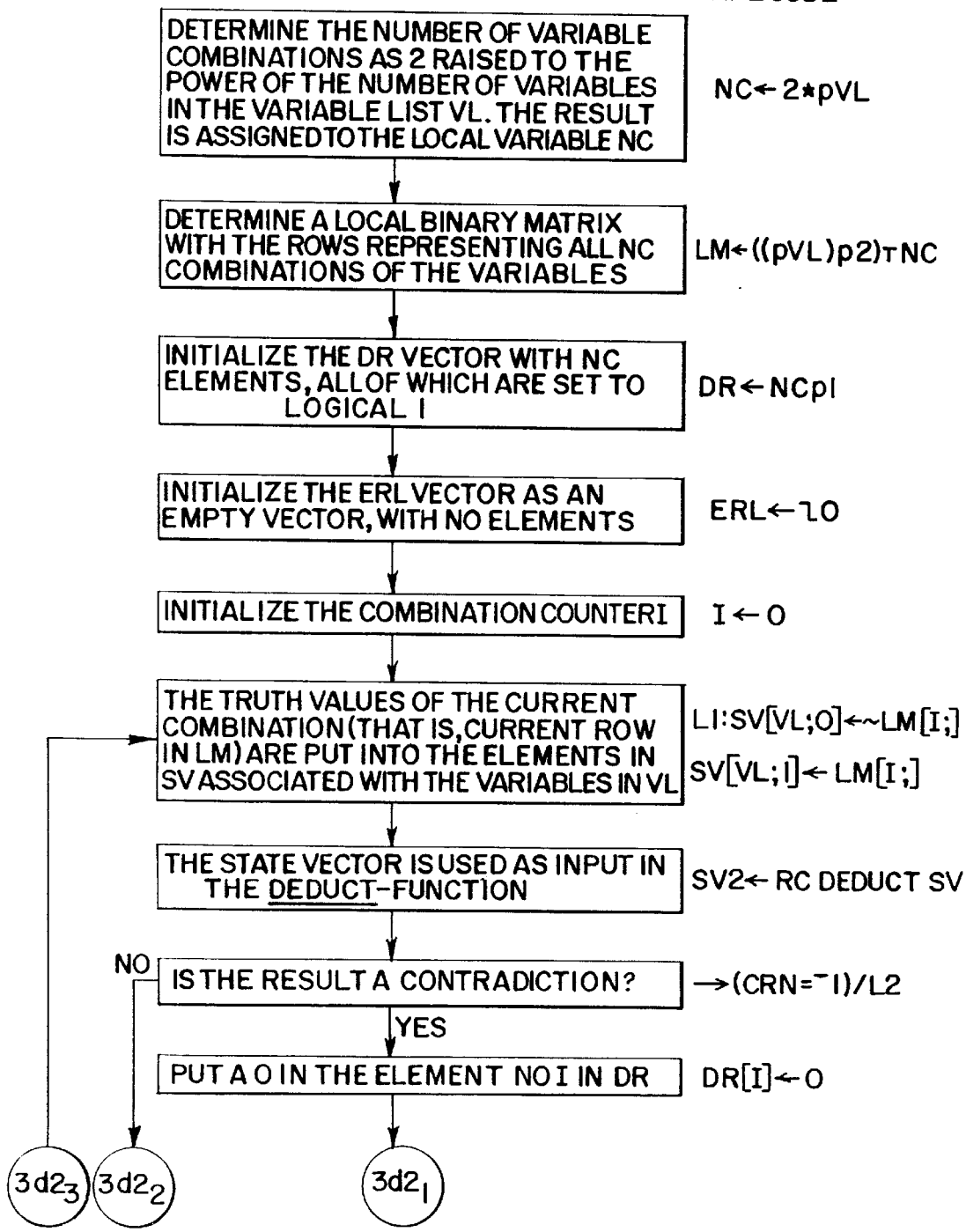

APL-FUNCTION RULEDET:

```
       ∇RULEDET [☐] ∇
       ∇ RC RULEDET  VL;NC;LM;I;SV2
[1]      NC←2*ρVL
[2]      LM←((ρVL)ρ2)⊤NC
[3]      DR←NCρI
[4]      ERL←10
[5]      I←0
[6]    L1:SV[VL;0]←~LM[I;]
[7]      SV[VL;1]←LM[I;]
[8]      SV2←RC DEDUCT SV
[9]      →(CRN=¯1)/L2
[10]     DR[I]←0
[11]     ERL←ERL,CRN
[12]   L2:I←I+1
[13]     →(NC>I)/L1
       ∇
```

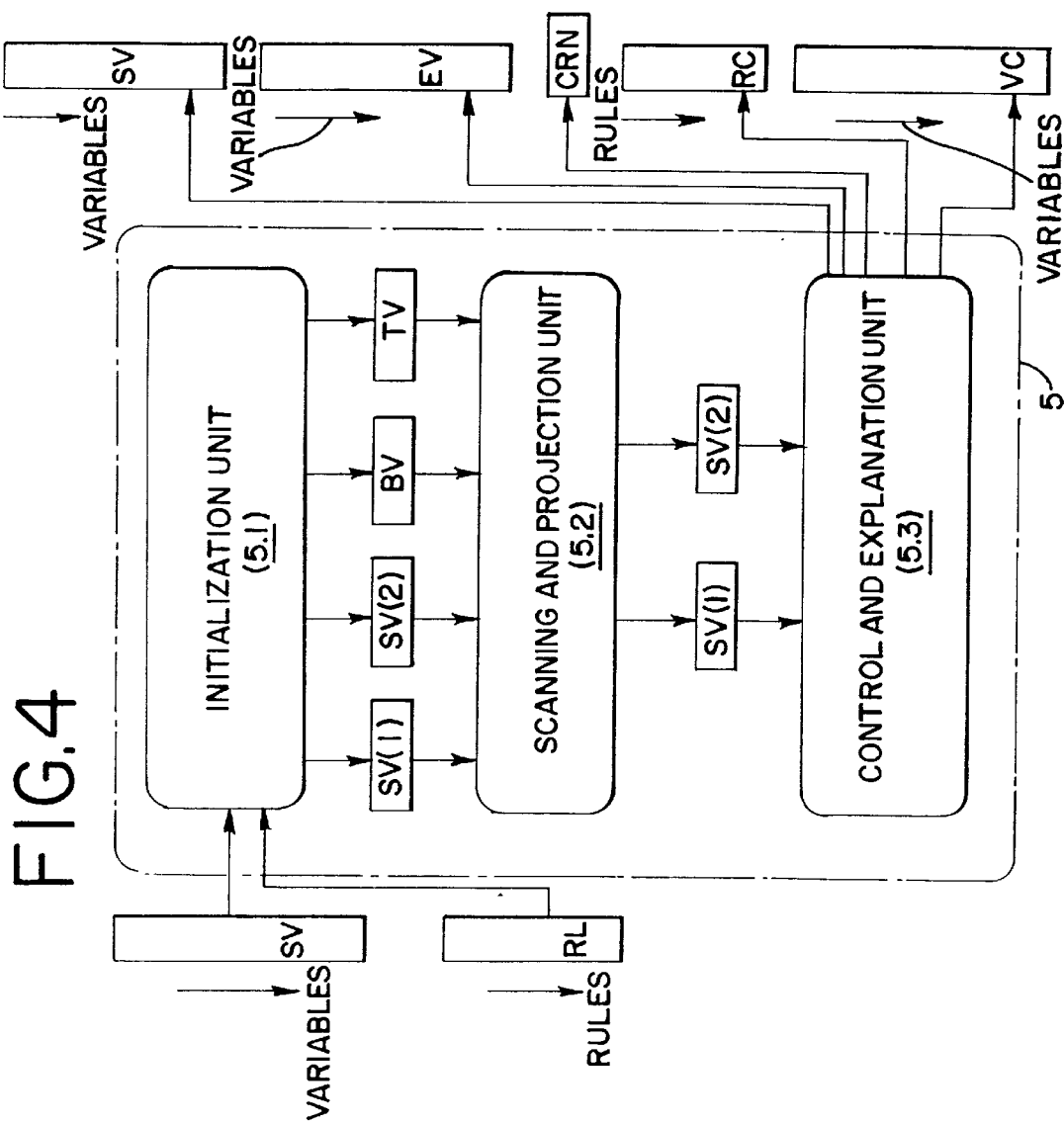

FIG.5
1) SIGNAL OR SYSTEM STATE REGISTER
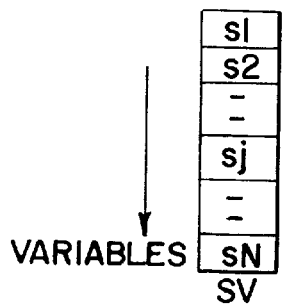
2) CONTROL REGISTERS
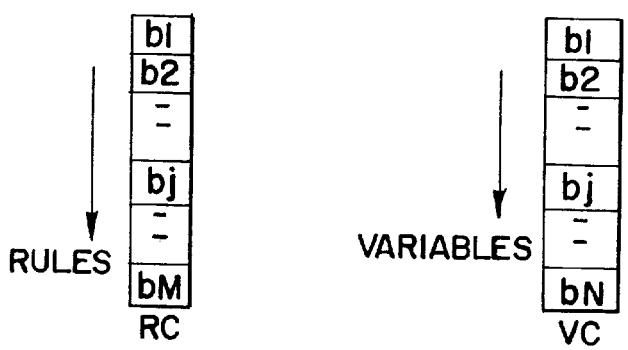
3) BUFFER REGISTER
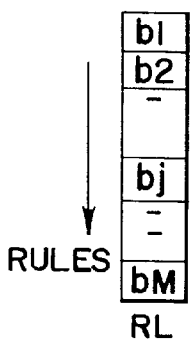
4) EXPLANATION REGISTERS
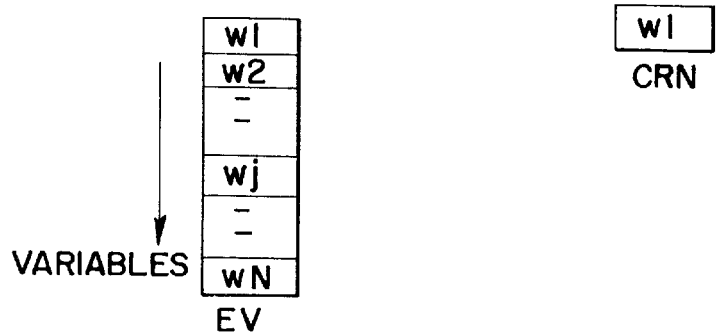

FIG.7

RULE 1:

|  | DISC | ROTATING | STBY |
|---|---|---|---|
| o o | — — | — o | o o |
|  | o o o | o o o | — |
| o | — o | — o | o |

SV:

| D | = | 1 |
| R | = | 1 |
| S | = | 0 |

→ VARIABLES

RULE 1:

|  | DISC | ROTATING | STBY |
|---|---|---|---|
| o | — | — | o |
|  | o o | o o | — |
| o | — | — | o |

SV:

| D | = | 1 |
| R | = | 0 |
| S | = | 0 |

→ VARIABLES

FIG.6

| DISC |
| PICKUP |
| ROTATING |
| STBY |

→ VARIABLES

2 RULE BASE MEMORY

RULE 1:

|  | DISC | ROTATING | STBY |
|---|---|---|---|
| o o | — — | — o | o o |
|  | o o o | o o o | — |
| o | — o | — o | o |

RULE 2:

| PICKUP | ROTATING |
|---|---|
| o | 1 |
| — o | — |
| — o | — |

PS:

| | VARIABLES → |
| RULES | 1 0 1 1 |
| | 0 1 1 0 |

PS MEMORY

FIG.14
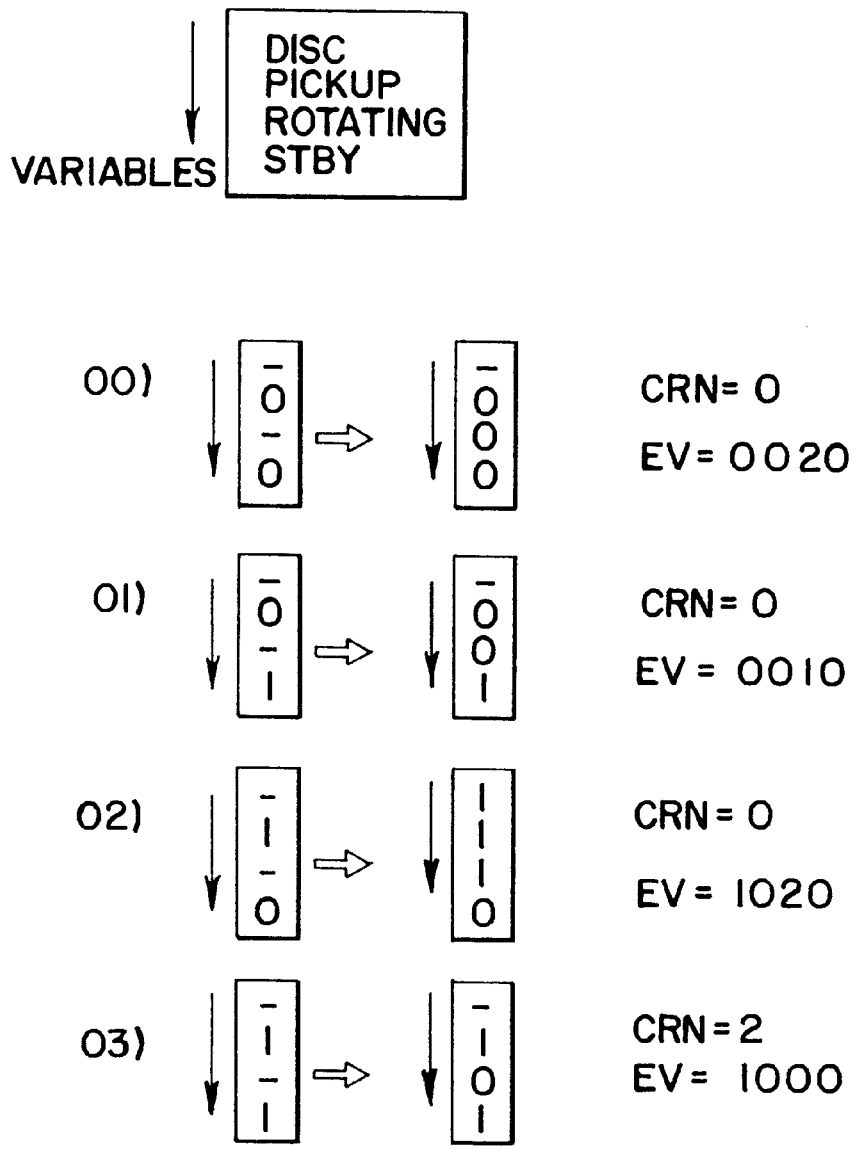

FIG.16
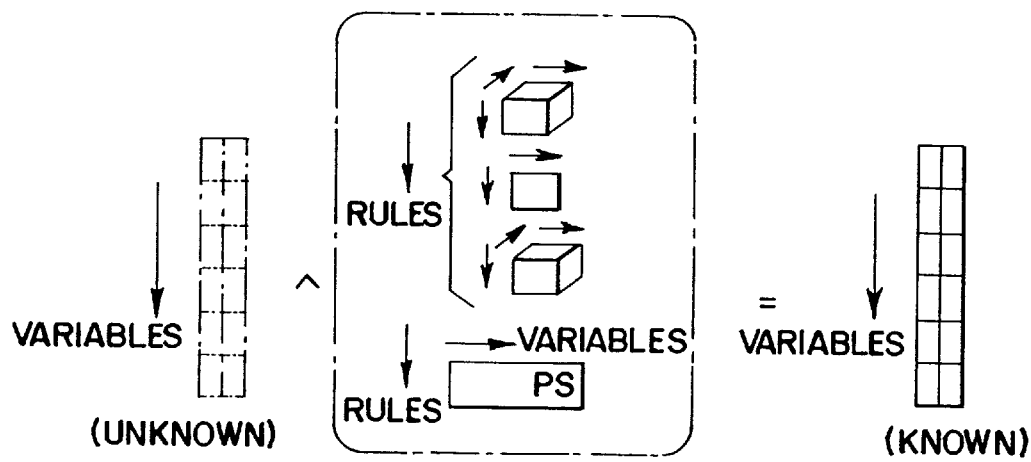
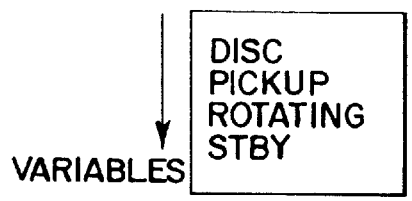
FIG.16A
THE STATE VECTOR IS NEGATED, DEDUCED, AND NEGATED AGAIN:
FIG.16B
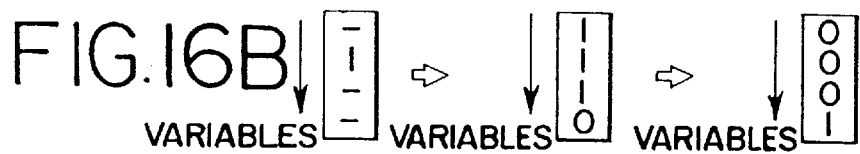

SIGNAL PROCESSING APPARATUS AND METHOD

This application is a continuation of U.S. patent application Ser. No. 08/895,438, filed Jul. 16, 1997; now U.S. Pat. No. 5,996,114, which is a division of U.S. patent application Ser. No. 07/887,244, filed May 19, 1992; ABN., which is a continuation of U.S. patent application Ser. No. 07/700,942, filed May 13, 1991; ABN., which is a continuation of U.S. patent application Ser. No. 07/424,112, filed Oct. 19, 1989, ABN.

BACKGROUND OF THE INVENTION

This invention related to apparatus and methods for processing signals, for example, signals used for communication or control purposes. It is particularly applicable to processing signals which can consist of a plurality of components each representative of an aspect of a physical entity and the invention provides means for improving the information content or reducing the uncertainty of such signals.

Signal processing systems are known which process signals consisting of a plurality of components in accordance with predetermined information about relationships between the components. So-called "artificial intelligence" systems employ processors which represent known relationships in some form of rule representation and apply the rule representation to an input signal to produce an output signal having an enhanced information content. Conventionally, the rule representation may contain a large number of logical relations between the possible components of the input signal (which, generally speaking, represent known information about a physical entity) and a searching process is carried out through the rule representation in an attempt to derive further relations and information. During the searching process further rules may be established and a large amount of information may have to be stored concerning the results of the application of individual rules already visited. Thus, a problem with conventional systems is that storage requirements may become very large. This has proved a disadvantage particularly when attempting to implement conventional systems in small-scale processing apparatus, such as microcomputer systems. A considerable amount of effort has also been devoted to rule searching strategies in an attempt to find techniques for rapidly arriving at the required information, but none of the known techniques are entirely satisfactory.

Therefore in view of the above, it is a primary object of the present invention to provide a signal processing apparatus and method, particularly of the artificial intelligence type, which may be operated using substantially reduced memory requirements than existing systems.

It is a further object of the present invention to provide a signal processing apparatus and method, particularly of the artificial intelligence type, which has a high execution speed.

It is a further object of the present invention to provide a signal processing apparatus and method which may be used for real time process or system control.

SUMMARY OF THE INVENTION

Viewed from one aspect, the invention provides signal processing apparatus for reducing the uncertainty of an input signal which can consist of a plurality of components each representative of an aspect of a physical entity, comprising means for storing a representation of sets of combinations of said components which indicate whether the combinations are possible, means for receiving said input signal and identifying any set which contains information about a component of said input signal which is determinate, means for identifying from the respective identified sets the combinations consistent with the values of the components of the input signal, and means for determining from the identified combinations the value of an indefinite component of the input signal.

Viewed from another aspect, the invention provides a method of enhancing the information content of an input signal by the use of stored rule information, comprising storing the signal in register means as a plurality of two-bit pairs each corresponding to a variable in the input signal, the rule information being stored as a binary unit comprising a predetermined number of binary bits, each binary unit representing an allowable combination of the variables ordered in the same manner as in the input signal, taking all of the first bits of the pairs as a first signal component and the second bits as a second signal component, combining in an OR relation a rule binary unit with one of the first and second components, combining in an OR relation the complement of the binary unit with the other of the first and second components, and storing the resulting combinations in register means.

Viewed from a third aspect the invention provides a method of processing data in accordance with information contained in a set of rules each expressing a relation between a plurality of variables, comprising converting each rule to a plurality of first binary units, comprising a predetermined number of binary bits, each binary unit indicating whether or not a particular combination of variables is allowable and a second plurality of binary units each corresponding to a rule and indicating which variables are involved in that rule, individual bits in the first and second binary units corresponding to individual variables ordered in the same order in all the first and second binary units, taking data containing known values of at least one of said variables, identifying from the first binary units any rule involving the known variable or variables, selecting the second binary units corresponding to the identified rules and using the selected binary units to determine the value of at least one other variable.

Viewed from a fourth aspect, the invention provides rule representation apparatus for processing information contained in a set of rules each expressing a relation between a plurality of variables, comprising a rule memory arranged to store binary units comprising a predetermined number of binary bits, each binary unit indicating whether or not a particular combination of variables is allowable, said binary units including bits representing the respective variables in the combinations, a control memory arranged to store respective binary units for each rule with the bits of each binary units indicating whether a particular variable is involved in the corresponding rule and the order of the variables associated with the binary units being the same as that of the control memory binary units, and addressing means providing access to each binary units of a particular rule in response to an output of the control memory indicating that the particular rule is required.

Preferably, the components of the input signal comprise binary representations of aspects of a physical entity; further preferably, the means for storing is arranged to store an array of binary codes each representing a combination of said components which is known to be possible.

Additional objects, advantages and novel features of the invention will be set forth in part in the description which follows, and in part will become apparent to those skilled in the art upon examination of the following or may be learned by practice of the invention. The objects and advantages of the invention may be obtained by means of the combinations particularly pointed out in the appended claims.

BRIEF DESCRIPTION OF THE DRAWINGS

FIG. 3B illustrates a preferred embodiment of the operation of the rule base scanning unit of FIG. 3 in flow chart form;

FIGS. 3C-1–3C-3 illustrate a preferred embodiment of the operation of the rule consultation unit illustrated in FIG. 3 in flow chart form;

FIG. 4 illustrates in more detail the rule consultation unit of FIG. 3;

FIG. 5 illustrates the contents of registers in the apparatus of FIGS. 3 and 4;

FIG. 6 illustrates the structure of the rule base of the apparatus of FIGS. 3 and 4;

FIG. 7 illustrates a preferred embodiment of the processing of a single rule;

FIG. 14 illustrates a preferred embodiment of the process of derived rule determination;

FIG. 16 illustrates a preferred embodiment of the process of abduction.

DETAILED DESCRIPTION OF THE PRESENTLY PREFERRED EMBODIMENTS

The following embodiments of the invention will now be described by way of example and with reference to the accompanying drawings. Referring first to FIG. 1, the signal processing apparatus is arranged to receive an input signal designated the input state vector SV and to convert it into an output signal, the output state vector, by the application of information contained in a rule base. The input state vector may contain information in some of the locations sl to sN about known aspects of a physical entity, for example, the state of sensors, but generally other components of the input state vector will be unknown. It is the function of the signal processing apparatus and method to determine some or all of the unknown components where the rule base enables this. The output state vector is said to be the conjunction of the input state vector and the rule base.

In the present embodiment, the possible values stored in the state vector each have one of four possible two-bit forms which have the following meaning:

0 1 true
1 0 false
1 1 tautology (undefined or don't care)
0 0 contradiction

Figure 3:
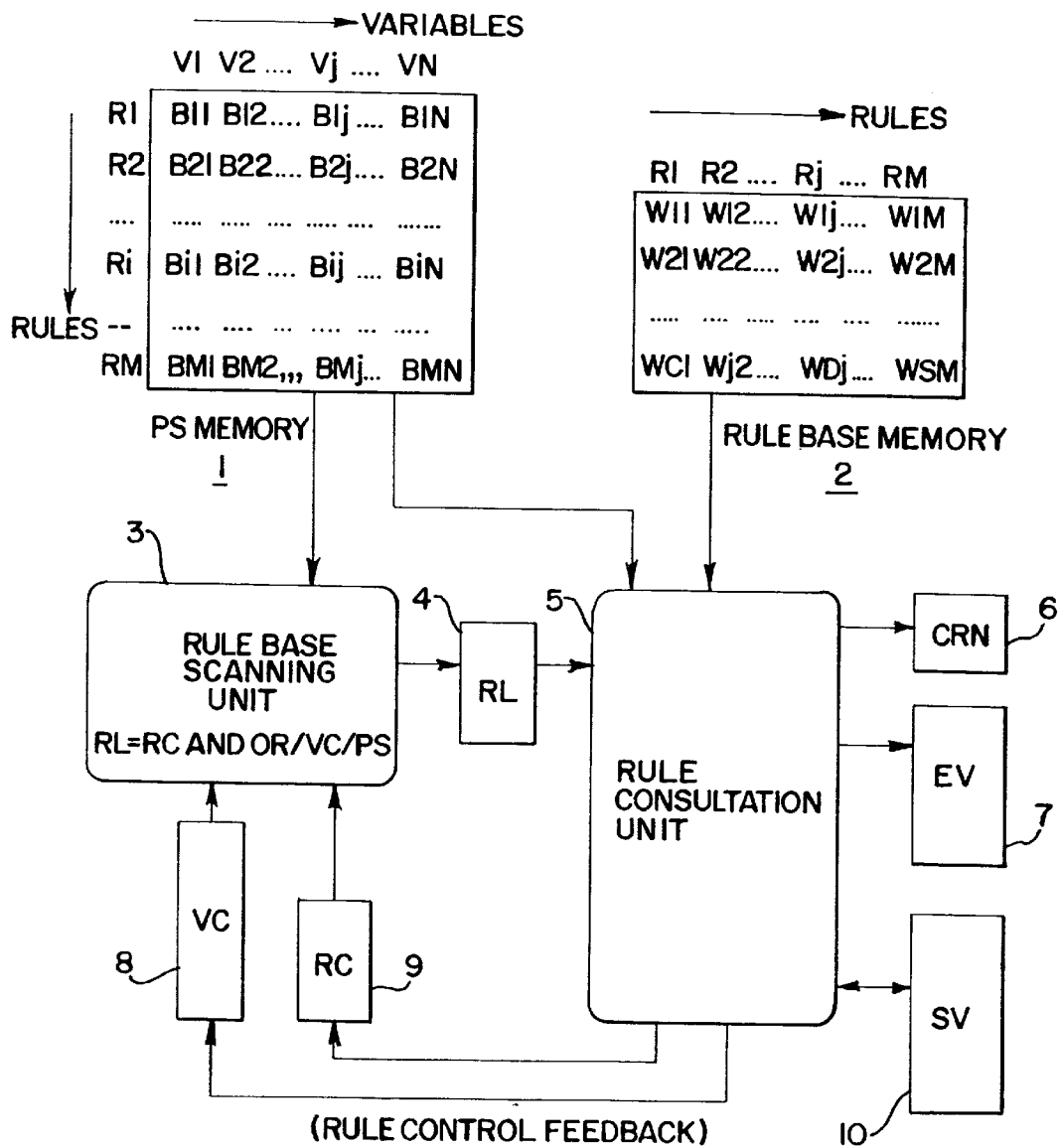
FIG. 3 is a block diagram of a preferred embodiment of a signal processing apparatus according to the invention.
Figures 1, 3A:
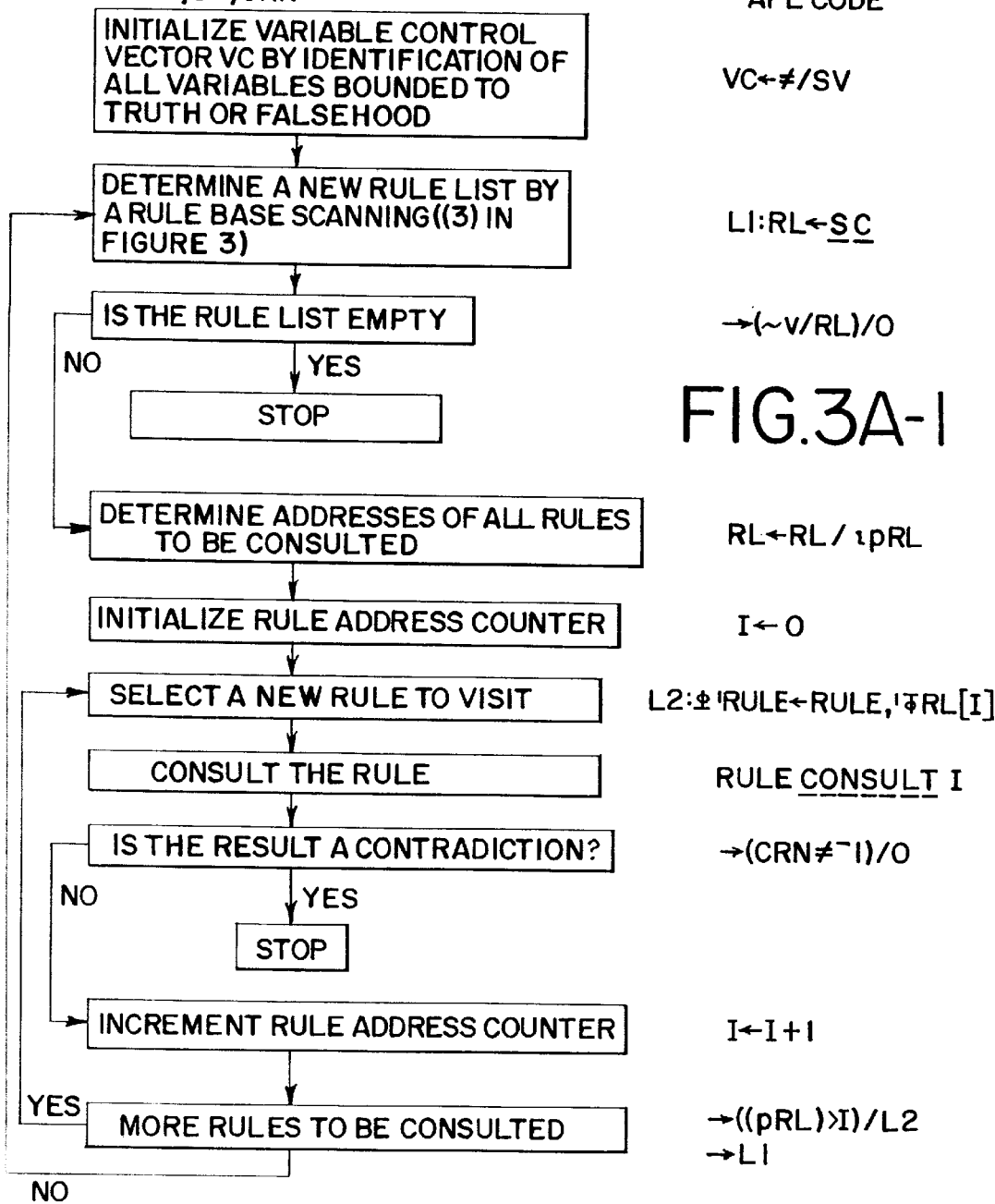
FIG. 1 illustrates a preferred embodiment of the general scheme of a signal processing method according to the invention.
FIG. 3A illustrates a preferred embodiment of the major data flow of the apparatus illustrated in FIG. 3 in flow chart form.
Figures 2, 3C:
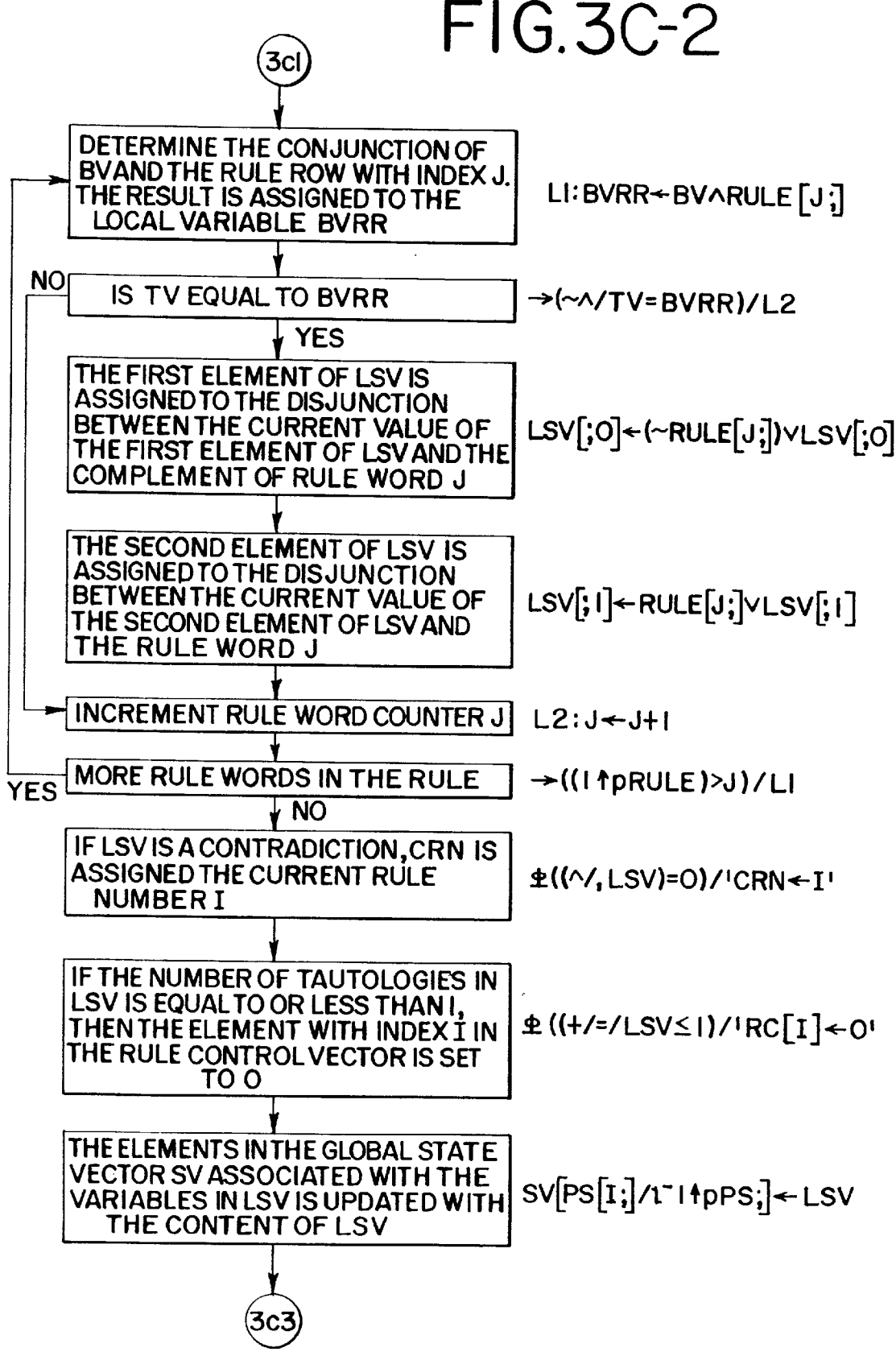
Figures 3, 3C:
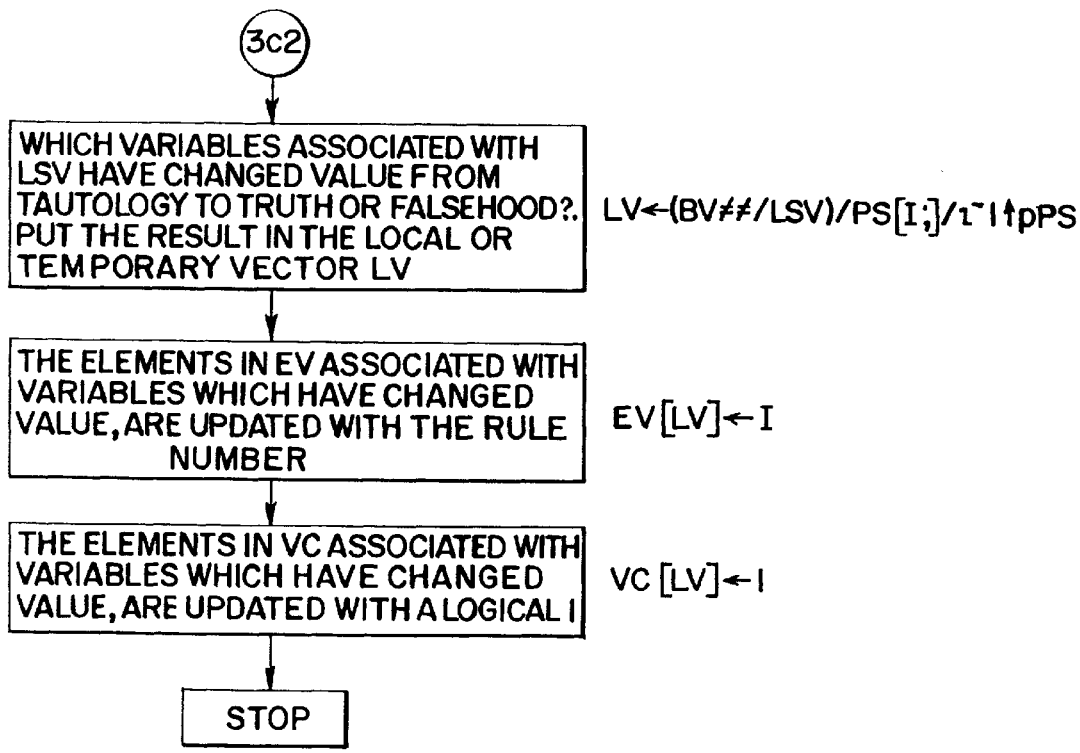

FIG. 2 shows three possible ways of representing in a digital form a propositional relation between three aspects of a physical system. The following rule is given by way of example: "If the system is at standby, or no disc is present, then the turntable is not rotating."

The Figure shows three binary state variables STBY, DISC, and ROTATING. Note that this rule is silent on certain combinations of the variables and thus also permits the turntable to be not rotating if a disc is present but the system is not at standby. FIG. 2A shows an array form of representing this rule in which each of the eight bits in the boxes is associated with one of the eight combinations of the three variables and indicates whether or not that combination is allowable. This form of representation has the disadvantages that more information than necessary is stored, and that the array can become very large and difficult to address when the number of variables becomes large.

FIG. 2B shows the rule represented in positive index form in which only the allowable combinations are listed. FIG. 2C shows the complementary negative index form which lists the unallowable combinations.

Referring now to FIG. 3, the main components of a preferred embodiment of the signal processing apparatus, also referred to as an inference engine, are shown. The apparatus comprises a rule base memory 2 which is a memory in which the rules are stored, preferably in positive index form. It is to be noted that the rules (the columns in the Figure) will generally not be all the same size, depending upon the number of legal combinations in each rule. This is indicated by the different suffices C, J, D and S. In addition, the apparatus preferably includes a proposition structure (PS) memory 1 which indicates the relation between the rules and the variables, i.e., which rules involve which variables. For example, a binary 1 will be stored at location Bij if variable Vj is involved in rule Ri. The information measured from the environment is stored in state vector register 10 and the apparatus preferably includes a rule consultation unit 5 which operates on the contents of this register using the information contained in the proposition structure memory 1 and rule base memory 2 to provide new values in the state vector register 10 with all possible new information deduced. During this process a list is kept in explanation vector 7 of the numbers of rules which have led to new information, and if a contradiction is encountered, the number of the rule giving the contradiction is stored in contradiction rule number register 6. The major data flow in the apparatus is illustrated in the flow chart of FIG. 3A. Since the presently preferred programming language is APL, the APL code is provided for each block in the flow chart adjacent the blocks in the flow chart of FIG. 3A. The rules which are consulted are determined based on the information in proposition structure memory 1 by a rule base scanning unit 3, rule list register 4 and variable control and rule control registers 8 and 9 as described in more detail below.

Before proceeding with a more detailed description of the apparatus, the information processing (inference) procedure will be explained with reference to a very simple case of only one rule. Assume, for example, that the rule is: "If A or not B, then not C." This rule is transformed to positive index form:

| A | B | C |
|---|---|---|
| 0 | 0 | 0 |
| 0 | 1 | 0 |
| 0 | 1 | 1 |
| 1 | 0 | 0 |
| 1 | 1 | 0 |

Suppose the input state "A is true; B and C are unknown" is measured from the environment. Thus, we have the input state vector:

| A | 0 | 1 |
|---|---|---|
| B | 1 | 1 |
| C | 1 | 1 |

The rule consultation unit is effective to identify all of the rows in the rule matrix which satisfy the input state vector constraints. In this example it is the last two rows only. Each column of the sub-matrix containing only the identified rows is then tested: if a column contains all 1s the corresponding state variable is bounded to be true; if all of the values in the column are 0, the state variable is bounded to be false; and if both 0 and 1 appear, the state variable is unbounded (tautology). Thus we have the following output state vector after the consultation:

| A | 0 | 1 |
|---|---|---|
| B | 1 | 1 |
| C | 1 | 0 | with the interpretation "A is true, and C is false; B is unknown."

Returning now to a more detailed description of the preferred embodiment, the rule base memory 2 and proposition structure memory 1 will first be discussed. A precondition for simple inference methods is an unambiguous and compact knowledge representation. In conventional systems, both of the well-known elements of knowledge, namely, rules and facts, are stored in the same "knowledge base." In the present invention, a clear distinction is made between rules and facts: rules or propositional functions are stored in the rule base memory 2 and facts are stored in the state vector register 10. Simple expressions and propositions like "A and B, (not a rule, but a system state with the facts "A is true" and "B is true") "A or not A" (tautology) and "A and not A" (contradiction or inconsistency, are regarded as facts and not rules.

In a practical system, an operator interface (known as a compiler) has to be provided for converting rules expressed by an operator as logical relations into the binary form (preferably positive index form) used in the rule base memory. The compiler may also check for redundancy in the input information and inconsistency with previous rules. The former may be carried out with the theorem proving technique described later, and the latter with the derived rule technique. With current technology, the positive index form is the most suitable due to high rule consultation speed, but the other forms may be used if preferred.

In the rule base memory 2, each legal bit combination in a rule is stored as a rule memory binary unit comprising a predetermined number of binary bits. The rule memory binary unit is stored in an addressable memory location, e.g., in a 16-bit word. As mentioned above, the rules may have different sizes; thus the first rule may occupy C words and the second J words. The order of the individual legal combinations in a rule is without importance for the function of the invention. However, the order of the state variables is important because of the addressing mechanism used, as will be described. The variables in any rule are ordered in accordance with a common scheme, hereinafter referred to as the "ordered set" or "domain." This makes it possible to make a very simple addressing of rules and variables.

As mentioned above, the proposition structure memory 1 indicates the binary relation between rules and variables. $B_{ij}$ is 1 if variable j is found in rule i, else 0. One may regard the contents of the PS memory as the fundamental addressing information which is used to determine which rules to visit. A simple example illustrating the contents of the rule base memory 2 and the proposition structure memory 1 is given FIG. 6. This concerns the following two rules:

Rule 1: "If the system is at standby, or no disc is present, then the turntable is not rotating."

Rule 2: "The pickup is on, if and only if, the turntable is rotating."

An order for the variables is selected to apply throughout the whole system, for example, the alphabetical order shown. The rules are transformed to positive index form (legal combinations), with the variables ordered in accordance with the predefined scheme or domain. The binary patterns are stored in the rule base memory 2. The corresponding proposition structure is stored in the PS memory 1. This clearly indicates that rule 1 involved STBY, DISC and ROTATING and rule 2 involves PICKUP and ROTATING. The variables within the rule words are ordered in accordance with the common domain, so the information in the PS memory indicates which variable the bits of the rule words represent. The operation of the rule base scanning unit 3 is illustrated in the flow chart of FIG. 3B (the respective APL code is also provided).

Alternatively, the information stored in the PS memory may be represented in one of the following index forms:

(1) All variable indices associated with a rule represented as an integer vector.

(2) All rule indices associated with a variable represented as an integer vector.

Thus, the alternative representations of the PS information in FIG. 6 are:

| (1) | Rule 1: 1 3 4 | |
|---|---|---|
| | Rule 2: 2 3 | , or: |
| (2) | Var 1: 1 | |
| | Var 2: 2 | |
| | Var 3: 1 2 | |
| | Var 4: 1 | |

The rule consultation unit 5 will now be explained in more detail, firstly with reference to processing a single simple rule. The operation of the rule consultation unit 5 is illustrated in FIGS. 3C-1–3C-3 in flow chart form. FIG. 7 represents the simple rule: "If the system is as standby, or no disc is present, then the turntable is not rotating." The input state measured from the environment is assumed to be "the system is at standby," giving the input state vector SV shown. The rule consultation-unit identifies rows in the rule matrix satisfying the state vector constraint, i.e., the shaded area. As mentioned above, each column in the shaded sub-matrix is tested and any column containing all 1s or all 0s is deduced to have the bounded value true or false respectively. Thus, the output state vector shown is determined, with the interpretation "when the system is at standby, the turntable is not rotating; whether or not a disc is present is now known."

In this process the input state vector may be said to be conjugated with the rule and the conjunct projected on every axis to determine the corresponding output state vector. If the rule is represented in positive index form, this process can be implemented with a very simple binary pattern recognition which is easy to execute in hardware. Referring to the embodiments illustrated in FIGS. 4 and 8, a global state vector is retained in the state vector register 10 and local state vector registers SV(1) and SV(2) are used in the rule consultation holding respectively the least significant bit and the most significant bit of the state vector. In order to optimize execution speed, the input constraints of the state vector are preferably stored in two further local sixteen bit registers TV (true variables) and BV (bounded variables, i.e., known to be true or false). The initialization unit 5.1 determines the rule address and the local input state vector by means of the global state vector 10 and proposition structure memory 1. Initially the local state vector registers are reset to zero. Thus, in the present example the initial values of the local registers are:

SV(1)= . . . 000
SV(2)= . . . 000
TV= . . . 001
BV= . . . 001

Figure 8:
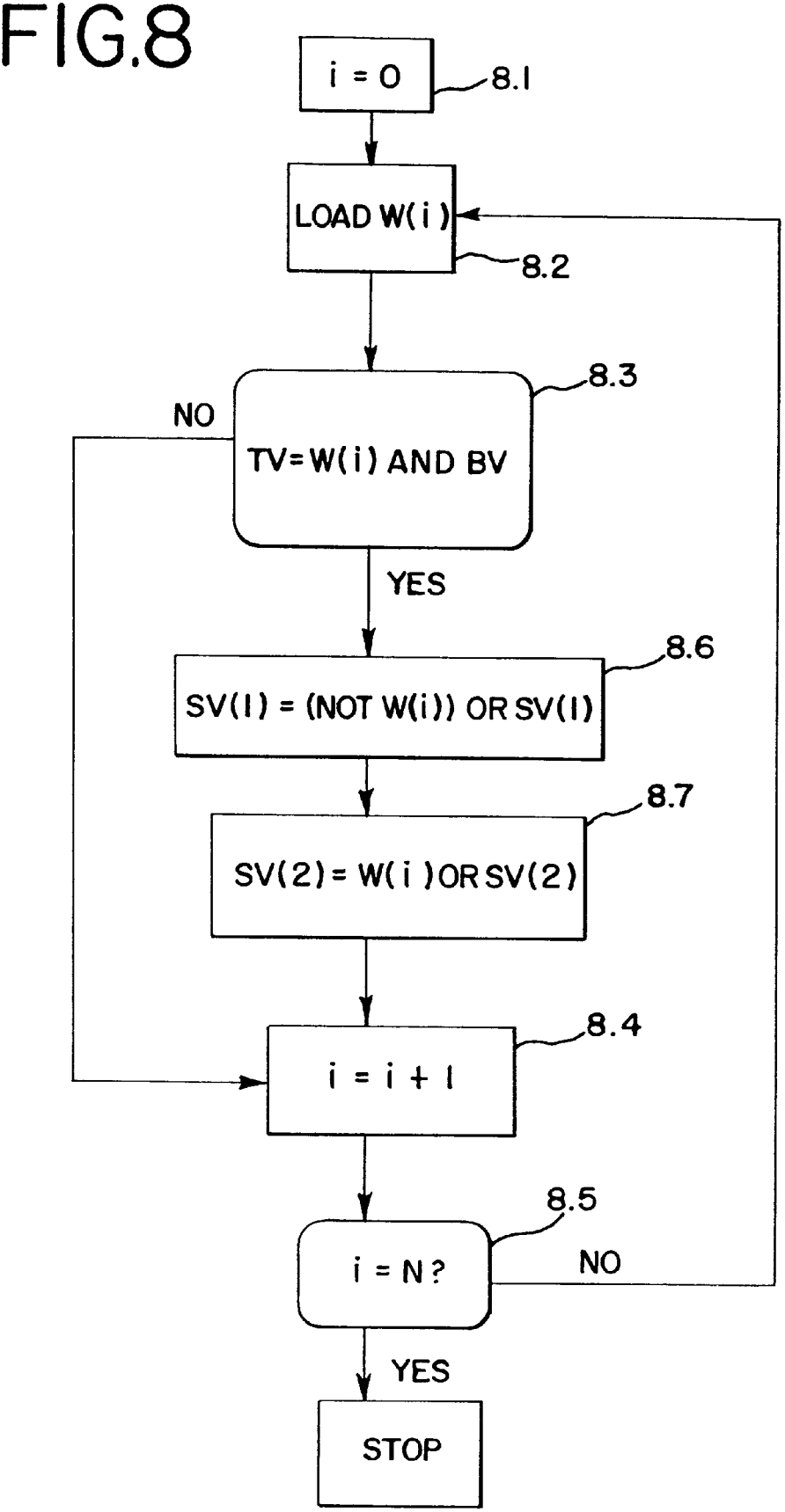
FIG. 8 is a flow chart of steps carried out in the rule consultation unit of FIGS. 3 and 4.

The steps of FIG. 8 are carried out in the scanning and projection unit 5.2 for a rule with N words W1, W2, . . . WN. In step 8.1 a temporary counter i is set to 0 and in step 8.2 the current word is loaded. In step 8.3 it is determined whether the current word satisfies the state vector constraints and if it does not, the next word is loaded via steps 8.4 and 8.5. If it does, the word is further tested via steps 8.6 and 8.7 which, in effect, OR the respective bits of the rule word with the corresponding upper bits of the local state vector and OR the complement of the rule word with the lower bits of the local state vector. It is to be noted that the steps 8.6 and 8.7 can be performed in either order and it is indeed possible to execute these operations in parallel for increased speed. The process terminates when all of the words have been tested as indicated by step 8.5.

In this example, the results of this process will be:
SV(1)=117
SV(2)=101
with the following interpretation:

|  | SV(1) | SV(2) |  |
| --- | --- | --- | --- |
| DISC | 1 | 1 | (tautology) |
| ROTATING | 1 | 0 | (false) |
| STBY | 0 | 1 | (true) |

The control and explanation unit 5.3 updates the global state vector and the global control and explanation registers in accordance with the local output state vector registers SV(1) and SV(2). The global state vector 10 is updated from the individual local sub-registers SV(1) and SV(2). The addresses of the variables are read from the PS memory. If the local output state vector is found to be a contradiction, the CRN register 6 is updated with the index or similar addressing information of the contradiction rule and the state search is then interrupted.

The explanation vector EV 7 is updated if one or more variables were deduced during the rule consultation. In the above-mentioned example, ROTATING was deduced to be false. Hence, the rule index or similar addressing information is put into the ROTATING element of the EV register. The index is read from the PS memory.

Similarly, the variable control register VC 8 is updated if one or more variables were deduced during rule consultation. Again, in the above-mentioned example, logical 1 is put into the ROTATING element of VC. Note that only newly bounded variables are identified in the VC register for rule control as described later. The rule control vector RC 9 is updated if the number of tautologies in the local output state vector is 0 or 1. A logical 0 is then put into the RC index of the current rule and this has the effect that that rule will not be consulted again.

At the end of the rule consultation, the newly inferred information is available for all of the other rules and for the external environment.

In some circumstances, e.g., in a so-called state event control system, it may be desirable to make only one consultation of the rule base, so that the consequences at only one level of the current input conditions are determined. However, many applications will require the determination of the maximum amount of further information and in this case, further consultation of the rule base (rule feedback) are required.

Therefore, another important aspect in the case of state event control is the distinction between input (independent) and output (dependent) variables. A very simple extension of the rule consultation technique mentioned so far, makes it possible to use the inference engine as a state event controller as well as a deduction machine. One may regard the state-event rules as dynamic rules, mapping the system state into a new state, and the normal propositional functions as static rules, representing a static state space.

Each rule is extended with an input/output header describing which variables are input and output (logical 1 and 0, respectively).

Consider for example the rule: (A or B)=C. If we select A,B as input variables, we get the following internal binary representation:

|  | A | B | C |
| --- | --- | --- | --- |
| I/O | 1 | 1 | 0 |
| RW1 | 0 | 0 | 0 |
| RW2 | 0 | 1 | 1 |
| RW3 | 1 | 0 | 1 |
| RW4 | 1 | 1 | 1 |

The rule words RW1 . . . RW4 are the normal positive index form. In this embodiment, A and B are independent; and each combination of A and B is associated with an output value.

When the rule is consulted, the BV register is assigned the value of the conjunction of the I/O header and the current BV value:

BV=I/O and BV

In the case of a rule without any distinction between input and output (a normal static rule), all variables are to be handled as input.

If the rule is dynamic, the RC register is not updated after the rule consultation. In this case, the search towards an equilibrium may involve several consultations of the same rule.

In this embodiment, static and dynamic rules are not allowed to be mixed in the same base.

The overall operation of the inference engine will now be described with particular emphasis on the handling of a plurality of rules. The conjunction of a single rule and the corresponding state vector variables has just been described and this take place repeatedly in the rule consultation unit 5. However, in a rule base with more than one rule, the rule base must be scanned to identify rules for consultation. Any rule which may deduce new information is a candidate and must be visited. The independent search module of the inference engine is the rule base scanning network 3, which generates the candidate rule numbers stored in the rule list register 4. The criteria of rule visitation are that at least one of the axes must be bounded to truth or falsehood, i.e., the rule involves a variable in the input vector which is determinate, and the current local state vector has not before been an input state vector of the same rule. All candidate rules with a common axis can be executed in parallel. When the candidates are consulted, a new search must be executed (the rule control feedback in FIG. 2) to find a new set RL of candidate rules.

The state vector transformation is finished when a minimum of tautologies (or a minimum of uncertainty in the signal represented by SV) has been reached; that is, when the candidate rule list RL is empty, or when a contradiction is identified during consultation. In the example of FIG. 6, with the input information "the system is at standby" the contents of the state vector are:

1 1

1 1

1 1

0 1

The contents of the rule control register will be:

RC=1 1.

A logical 1 in the rule control register means that the corresponding rule is to be searched. A zero makes it possible to disregard the rule as a rule candidate. In the present case, both rules are accepted to visit. The variable control register has the following value:

VC=0 0 0 1.

Here a logical 1 means that the corresponding variable is identified as having been bounded since the last state search. By default, all of the bounded variables in the input state vector are identified with a 1.

Figure 9:
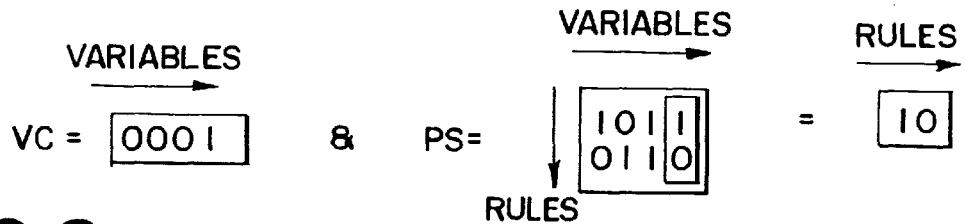
FIG. 9 illustrates a preferred embodiment of the logical process for identifying rules to visit performed by the rule base scanning unit of FIG. 3.

A list of candidate rules is determined by means of the rule base scanning unit 3 using the information from VC, RC and the PS memory, as illustrated in FIG. 9. The mathematical expression is: $RL_i = RC_i$ and (or $(VC$ and $PS)_i$). In other words, the variable control word is ANDed with each row separately of PS and then the results are ORed to determine in which rules the bounded variables in VC occur, as indicated in the first line of FIG. 9. The result is conjugated with RC element by element as illustrated in the second line of FIG. 9. The rule control RC register may be user-accessible so that the user can exclude rules from the search.

All the rules identified in the rule list register RL are consulted. In this case only, the first rule is a candidate. As illustrated above, the result of the consultation is a deduction that ROTATING is false. This information may imply new deductions in other rules. Therefore, the ROTATING variable is set to a 1 in the VC register:

VC=0 0 1 0.

The explanation vector EV 7 is updated also. The third variable was deduced in rule 1 and so the integer value 1 is stored in the third location of EV:

EV=0 0 1 0.

If the rule consultation had resulted in a contradiction, the CRN register 6 would be updated with the current rule number and the search terminated.

It is not possible to deduce more information from the current rule due to the fact that two of the three axes are bounded. Therefore, a zero is placed in the rule control register RC to prevent further visits to this rule:

RC=0 1

Figure 10:
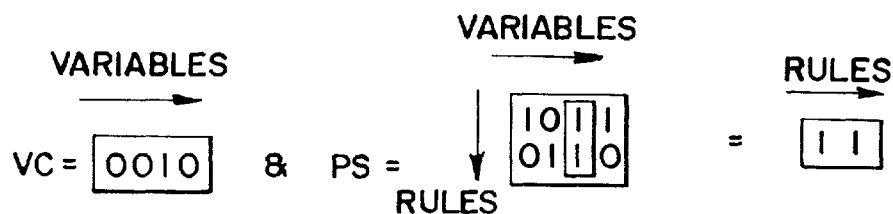
FIG. 10 shows the same process as FIG. 9 on a second iteration.
Figure 11:
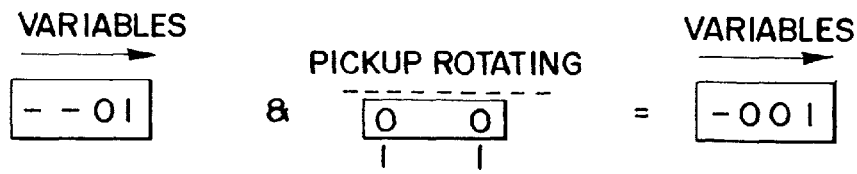
FIG. 11 shows the results of the rule consultations of FIG. 9 and 10.

The rule base scanning unit is now reactivated to perform rule control feedback and to determine a new rule list. The process is shown in FIG. 10 and is similar to that of FIG. 9. The VC register is initialized to zero. Rule 2 is the only rule for consultation in the list and it is consulted in a process similar to that described above with reference to FIG. 7. The result is shown in FIG. 11. In the state vector variables here (and in FIG. 16 below) the values 0 and 1 are used for brevity to represent false and true. All of the variables in rule 2 are now bounded and so RC is updated with a zero:

RC=0 0

The variable PICKUP was deduced in rule 2 and so the explanation vector EV is updated:

EV=0 2 1 0

Rule control feedback takes place again to reactivate the rule base scanning unit, but this time the rule control vector RC is zero and the rule list is zero and so the deduction is finished.

Naturally, in a more complex case, more than one variable may be deduced in a rule consultation.

Figure 12A:
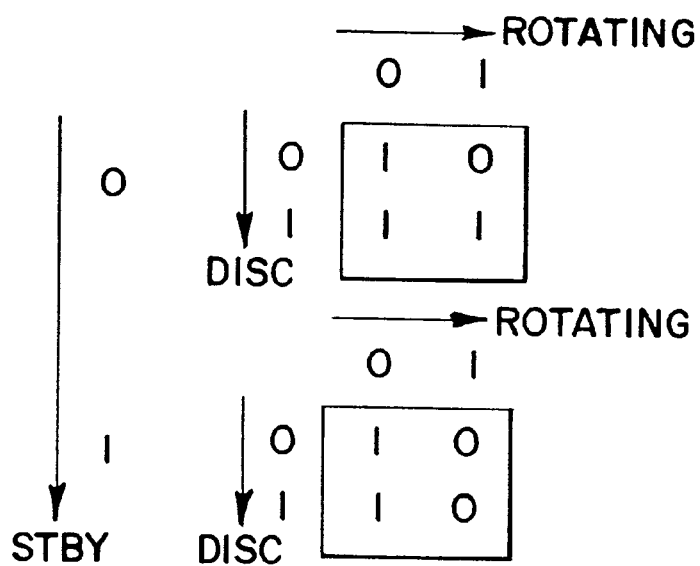
FIG. 12 illustrates a preferred embodiment of a rule consultation process using an array rule representation.
Figure 12B:
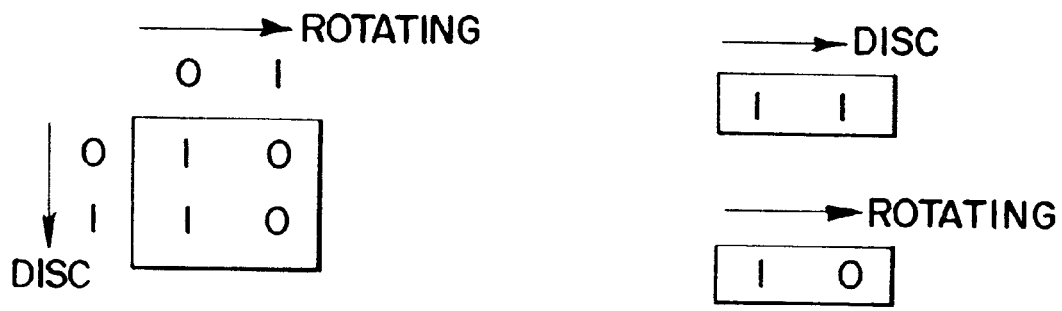

The positive index form of rule representation has been particularly described above. However, the array representation can be used as shown in FIG. 12. FIG. 12A shows the same rule as used in the examples above as a three-dimensional array. Again, the example assumes the input STBY is true. The conjunct of the input state vector and the rule is an array with the same structure as the rule (FIG. 12B) and the projection on each axis is carried out by means of the OR function (disjunction operation). Obviously, the projection on the input constraint axes will give an equivalent output. Thus, it is only necessary to do the projection on the unbounded (tautology) axes. This is an alternative implementation of the rule consultation; however, it requires a more complicated pattern search and with current technology, the positive index form gives the fastest consultation speed.

Figures 2, 3D:
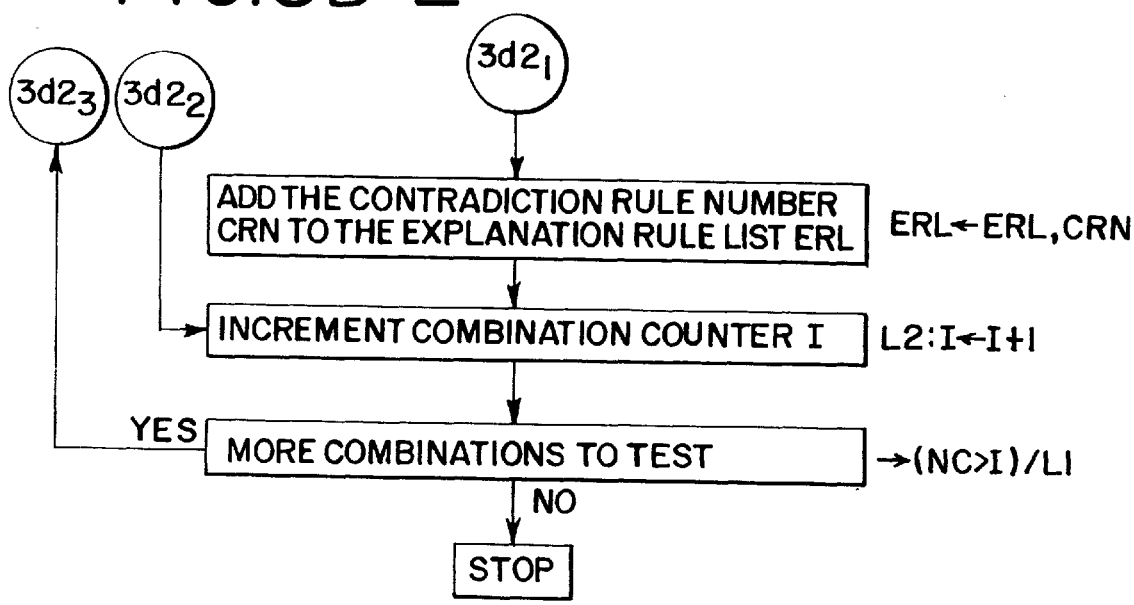
FIG. 2 represents three possible preferred embodiments of knowledge representation.
FIG. 3D illustrates a preferred embodiment of the rule determination unit in flow chart form.
Figure 13:
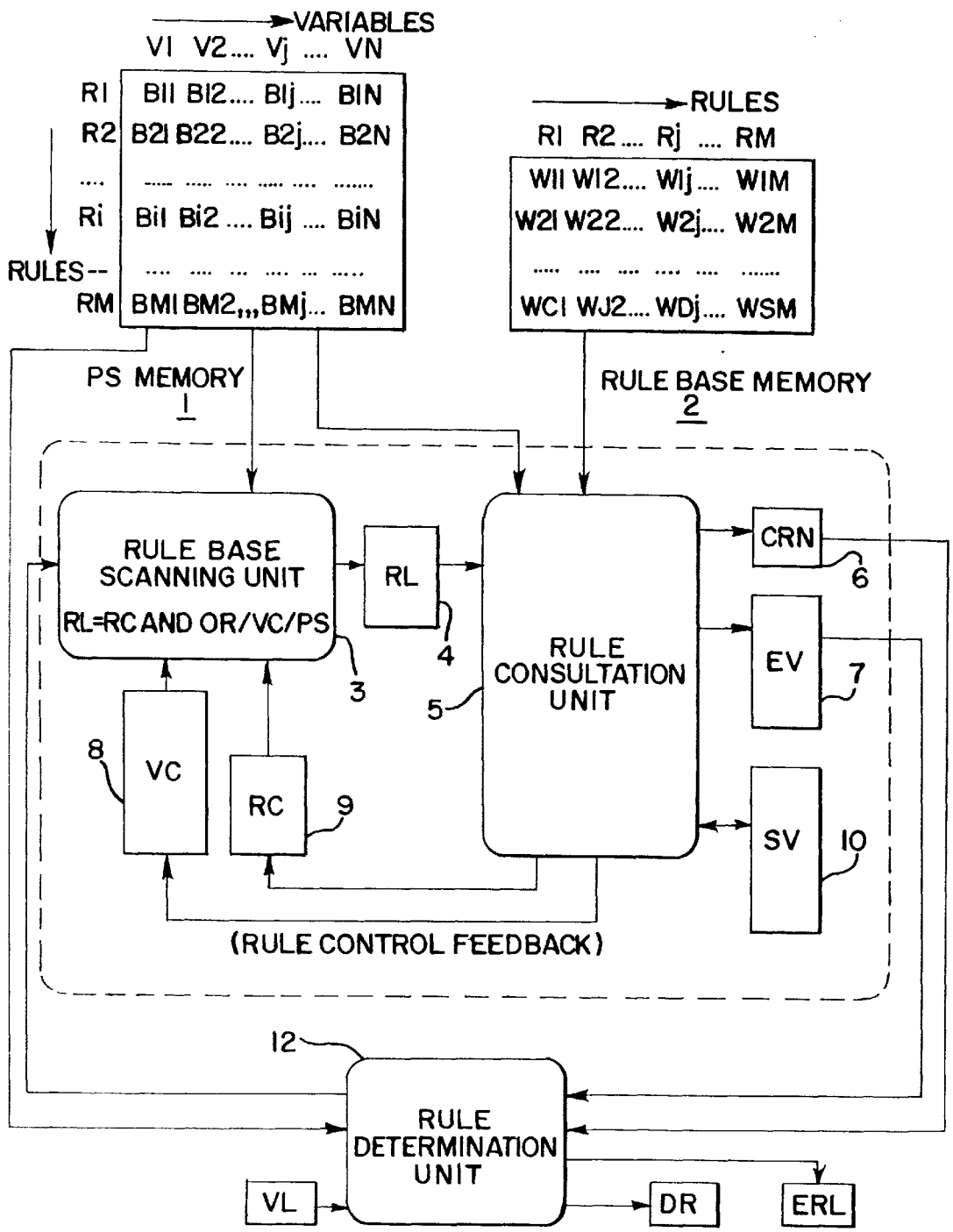
FIG. 13 shows the inference engine of FIG. 3 extended with a rule determination unit and further registers.

The well-known inference techniques like resolution, modus ponens, or modus tollens, may be carried out straightforwardly by means of the state vector transformation described above. However, more complex or composite inferences such as the determination of derived rules, theorem proving and abduction may be performed by the apparatus and method of the invention. FIG. 13 shows the inference engine extended with a rule determination unit 12 and further registers VL (variable list), DR (derived rule) and ERL (explanation rule list). FIG. 3D illustrates, in flow chart form, a preferred embodiment of the operation of the rule determination unit 12.

The input vector VL contains integer values indicating the variables involved. In the example of FIG. 14, the problem is to determine the derived relation between the variables PICKUP and STBY, so VL=2 4. The relation is determined by testing the validity of all of the combinations of the variables. If the output CRN (contradiction rule number) is 0, the combination is valid, otherwise it is invalid. The four possible combinations are shown in FIG. 14 and the results stored in the derived rule register. The relation may be recognized as a NAND relation; that is, "system standby" and "pickup on" will never appear at the same time. By means of CRN, EV, and PS it is easy to make an explanation rule list with all of the rules involved in the inference:

ERL=1 1, i.e., both rules are involved.

Figure 15:
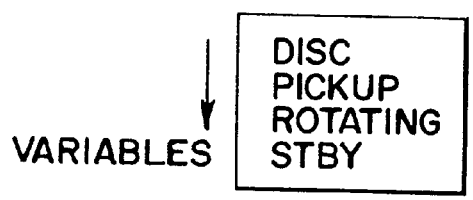
FIG. 15 illustrates a preferred embodiment of the process of theorem proving.
Figure 15A:
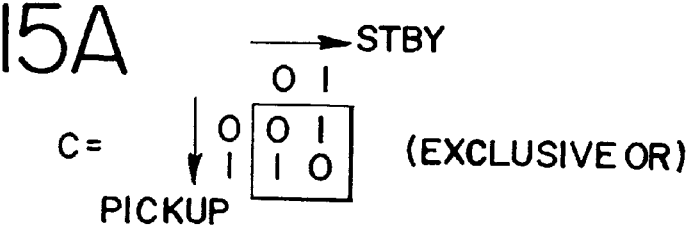
Figure 15B:
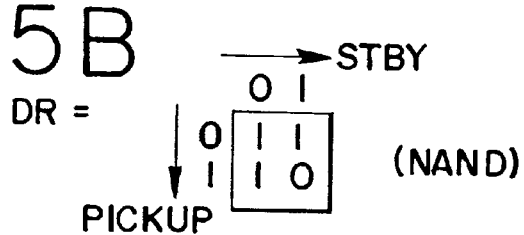
Figure 15C:
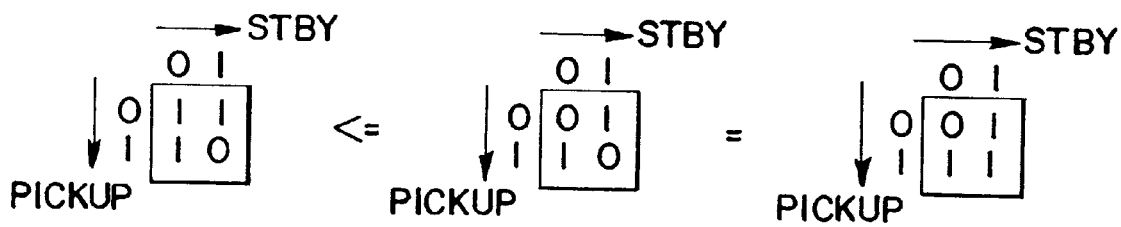

FIG. 15 illustrates the principle of theorem proving, which is based on the derived rule determination technique. The problem is to prove that the predefined rule set implies a user-defined conclusion. In this case, the derived relation between the variables and the conclusion is compared element by element with the binary representation of the conclusion. Given the rule base of FIG. 6, the example is to provide that EITHER the system is at standby OR the pickup is on. The conclusion to prove is an exclusive OR relation between PICKUP and STBY (FIG. 15A). The derived relation (FIG. 15B) between PICKUP and STBY was proved in the previous example. The theorem C is proved if DR implies C, that is, DR is less than or equal to C for all elements. As may be seen from FIG. 15C, the condition is not satisfied. Hence, the theorem cannot be proved.

FIG. 16 illustrates abduction. Here the output state vector is known, and the problem is to determine all the input state vectors (premises) implying that conclusion. This is carried out by a primitive deduction (state vector transformation) of the negated constraint output state vector. FIG. 16 relates to the same rules as FIG. 6, and the output state vector "PICKUP is false" is given (FIG. 16A). This state vector is negated, deduced and negated again (FIG. 16B) giving the conclusion: "no disc," "turntable not rotating" or "system is at standby," imply the conclusion "Pickup is off."

Alternatively, the abduction process may be carried out without negating the output state vector. In this case, the end user specifies the known output state vector and a set of input variables. The system deduces all combinations of input variables and compares the result of each deduction with the specified output state vector. If the determined and the specified output state vector are equal, a corresponding input state is stored. Hence, the result of this abduction process is the set of input combinations satisfying the output constraint.

It will be seen that the present invention, at least in its described embodiments, provides the following features and advantages: the knowledge base is represented in a compact binary format with each rule transformed to a truth table. The size of the knowledge base is therefore approximately proportional to the number of rules and independent of the number of state variables. Therefore, there is no problem with "combinational explosion."

The logical transformation is based on a parallel search of binary patterns. The technique can be implemented in any programming language, but it is suitable for implementation in parallel processing hardware. Any switching circuit technology may be a candidate, including electrical, mechanical or optical devices, but obviously a semi-conductor chip implementation is most practical at present.

The logical transformation is carried out without changing the rule base, in contradiction to the conventional approach in which derived rules are added temporarily during the state search. Therefore, our rule base has a fixed size during inference, which is important when implemented in small-scale microcomputer systems. The logical transformation is usually executed with fewer rule consultations and higher execution speed than conventional inference methods.

In practice, the logical transformation may be carried out as the transformation of a binary state vector representing aspects of a physical entity. The input state vector represents the known or measured system state and the system may interact directly with physical devices such as transducers generating the input state vector. The output is, of course, a state vector updated in accordance with the input stimuli (the input state vector) and the system constraints (the knowledge base).

The state vector can include tautology (don't care) and contradiction (inconsistency) as state values to be treated like truth and falsehood. Therefore, the system can identify and manipulate inconsistent or superfluous knowledge.

All of the inference methods performed are based on just one fundamental logical transformation. Well known inference methods such as resolution, modus ponens or modus tollens may be carried out straightforwardly by means of this new transformation. Composite and complex inference techniques, like derived rule determination or theorem proving, may also be executed straightforwardly by two or more state vector transformations using parallel or sequential processing.

This new inference technology makes it possible to introduce artificial intelligence in many important new application areas, including small-scale microcomputer systems for real-time process control.

In one possible form, the invention may be embodied in a coprocessor for a microcomputer, or other controller, either as a special-purpose integrated circuit, or as a board adapted to be connected to the address and data bus of the computer. Software provision may be made for interfacing the coprocessor with programming languages commonly used in industrial control, such as PASCAL, APL and C, whereby programs written in these languages may call information processing routines in the coprocessor.

Although the invention has been described in connection with variables which have two states, it can be used in systems in which variables can take values over a continuous range. In such a system, the ranges may be divided into relatively small sub-ranges, and a value of a variable falling or not within one of the small sub-ranges can be represented in binary form and processed with the techniques described.

Further, the invention can be extended to so-called fuzzy logic systems in which each rule state has a certain probability value, by storing probability values in association with the combinations stored in the rule base memory 2. These values can then be processed during or after the processing of the state vector and rule base information.

The foregoing description of the preferred embodiments of the present invention has been presented for purposes of illustration and description. They are not intended to be exhaustive or to limit the invention to the precise forms disclosed, and obviously many modifications and variations are possible. The embodiments were chosen and described in order to best explain the principles of the invention and its practical applications. It is intended that the scope of the invention be defined by the following claims, including all equivalents.

What is claimed is:

1. A signal processing method for reducing the uncertainty of an input signal which comprises a plurality of components, each representative of an aspect of a physical entity, the method comprising:

(a) storing an array representation of sets of propositional rules in an addressable memory, the sets representing defined relationships between the components such that the values of the components are constrained to values consistent with the rules, each set indicating all possible combinations of the components involved in the set, (b) storing an array representation indicating which sets define a relationship for a component in a proposition storage memory, (c) scanning the proposition storage memory to identify all rules which define a relationship for a component of the input signal which is defined, (d) addressing the respective identified sets in the addressable memory and identifying from the respective identified sets the combinations consistent with the values of the components of the input signal, and (e) determining from the identified combinations the value of an indefinite component of the input signal by determining which components have the same defined value in all of the identified sets.

2. A method of enhancing the information content of an input signal by the use of stored binary representation of rule information, the method comprising:

(a) storing the signal in register means as a plurality of two-bit pairs each corresponding to a variable in the input signal, (b) storing an array representation of sets of propositional rules in an addressable memory, the sets representing defined relationships between the components such that the values of the components are constrained to values consistent with the rules, each set indicating all possible combinations of the components involved in the set, the representation of rules of combinations comprising binary units with the bits ordered to correspond to the order of the components of the input signal, (c) storing an array representation indicating which sets define a relationship for a component in a proposition storage memory, (d) scanning the proposition storage memory to identify all rules which define a relationship for a component of the input signal which is defined, (e) addressing the respective identified sets in the addressable memory and identifying from the respective identified sets the combinations consistent with the values of the components of the input signal, (f) determining from the identified combinations the value of an indefinite component of the input signal by determining which components have the same defined value in all of the identified sets, (g) taking all of the first bits of the pairs as a first signal component and the second bits as a second signal component, (h) combining in an OR relation a binary unit representing one of the rules with one of the first and second components, (i) combining in an OR relation the complement of the binary unit representing the respective rule with the other of the first and second components, and (j) storing the resulting combinations in register means as an output signal.

3. The method as claimed in claim 2 wherein the binary units comprise binary words.

4. A method of processing data in accordance with information contained in a set of rules, each expressing a relation between a plurality of variables, the method comprising:

(a) converting each rule to a plurality of binary representations, each binary representation comprising first binary units comprised of a predetermined number of binary bits, each binary unit indicating whether or not a particular combination of variables is allowable and a second plurality of binary units, each corresponding to a rule and indicating which variables are involved in that rule, individual bits in the first and second units corresponding to individual variables ordered in the same order in all the first and second units, (b) storing the first binary units in an addressable memory, (c) storing the second plurality of binary units in a proposition storage memory, (d) storing an input signal in register means as a plurality of two-bit pairs each corresponding to a variable in the input signal, (e) scanning the proposition storage memory to identify all rules which define a relationship for a component of the input signal which is defined, (f) addressing the respective identified sets in the addressable memory and identifying from the respective identified sets the combinations consistent with the values of the components of the input signal, and (g) determining from the identified combinations the value of an indefinite component of the input signal by determining which components have the same defined value in all of the identified sets.

5. The method as claimed in claim 4 wherein the binary units comprise binary words.

6. A method as claimed in claim 5 wherein the first words represent the rules in positive index form such that they contain all of the allowable combinations of the variables involved in the respective rules.

7. Rule representation apparatus for processing information contained in a set of rules, the rule representation apparatus comprising:

receiving means for receiving the input signal, a binary-representation rule memory arranged to store binary words, each indicating whether or not a particular combination of variables is allowable, said words including bits representing the respective variables in the combinations, a control memory arranged to store respective binary words for each rule with the bits of each word indicating whether a particular variable is involved in the corresponding rule and the order of the variables associated with the rule memory words being the same as that of the control memory words, scanning means for receiving the input signal from said receiving means and for scanning the control memory to identify all rules which define a relationship for a component of the input signal which is defined, processing means for addressing the respective identified sets in the binary-representation rule memory and identifying from the respective identified sets the combinations consistent with the values of the components of the input signal, and means for determining from the identified combinations the value of an undefined component of the input signal by determining which components have the same defined value in all of the identified sets.

* * * * *

UNITED STATES PATENT AND TRADEMARK OFFICE
CERTIFICATE OF CORRECTION

PATENT NO. : 6,158,043
DATED : December 5, 2000
INVENTOR(S) : Gert Lykke Moeller It is certified that error appears in the above-identified patent and that said Letters Patent is hereby corrected as shown below:

Title page,
Line 8, under "U.S. PATENT DOCUMENTS", change "Feete" to -- Fette --.

Signed and Sealed this

Eighth Day of January, 2002

*Attest:*

JAMES E. ROGAN
*Attesting Officer*  *Director of the United States Patent and Trademark Office*